United States Patent [19]

Wicki

[11] Patent Number: 4,468,348
[45] Date of Patent: Aug. 28, 1984

[54] TRISAZO DYES HAVING A 4-(1-AMINO-3,6-DISULFO-8-HYDROXY-7-PHENYLAZONAPHTHYL-2-AZO)-PHENYLAZO GROUP LINKED TO A COUPLING COMPONENT RADICAL

[75] Inventor: Heinz Wicki, Basel, Switzerland

[73] Assignee: Sandoz Ltd., Basel, Switzerland

[21] Appl. No.: 118,595

[22] Filed: Feb. 4, 1980

Related U.S. Application Data

[63] Continuation of Ser. No. 746,482, Dec. 1, 1976, abandoned, which is a continuation-in-part of Ser. No. 614,378, Sep. 18, 1975, abandoned, which is a continuation-in-part of Ser. No. 398,583, Sep. 19, 1973, abandoned.

[30] Foreign Application Priority Data

| Sep. 26, 1972 | [CH] | Switzerland | 14028/72 |
| Oct. 20, 1972 | [CH] | Switzerland | 15413/72 |
| Oct. 4, 1974 | [CH] | Switzerland | 13378/74 |
| Jul. 25, 1975 | [CH] | Switzerland | 9735/75 |

[51] Int. Cl.³ ............ C09B 31/16; C09B 31/20; C09B 31/24; C09B 31/28
[52] U.S. Cl. .................... 260/159; 8/638; 8/641; 260/169; 260/173; 162/162
[58] Field of Search .............. 262/169, 173, 159; 8/638, 641

[56] References Cited

U.S. PATENT DOCUMENTS

| 683,190 | 9/1901 | Taggesell | 260/169 |
| 1,565,344 | 12/1925 | Vossen | 260/169 |
| 1,923,944 | 8/1933 | Mendoza et al. | 260/169 |
| 2,833,756 | 5/1958 | Fleischhauer | 260/169 |
| 3,917,887 | 11/1975 | Clarkson et al. | 260/169 X |

FOREIGN PATENT DOCUMENTS

| 805235 | 12/1978 | Belgium | 260/169 |
| 65651 | 2/1891 | Fed. Rep. of Germany | 260/169 |
| 566471 | 6/1928 | Fed. Rep. of Germany | 260/169 |
| 582399 | 6/1928 | Fed. Rep. of Germany | 260/169 |
| 868034 | 6/1952 | Fed. Rep. of Germany | 260/169 |
| 917991 | 2/1954 | Fed. Rep. of Germany | 260/169 |
| 2363603 | 6/1974 | Fed. Rep. of Germany | 260/169 |
| 2305616 | 8/1974 | Fed. Rep. of Germany | 260/169 |
| 835111 | 12/1938 | France | 260/169 |
| 1123473 | 9/1956 | France | 260/169 |
| 2211510 | 12/1974 | France | 260/169 |
| 49-39619 | 4/1974 | Japan | 8/41 |
| 7317397 | 1/1975 | Netherlands | 260/169 |
| 7401357 | 12/1975 | Netherlands | 260/169 |
| 163182 | 10/1933 | Switzerland | 260/169 |
| 326961 | 2/1958 | Switzerland | 260/169 |
| 1098126 | 1/1968 | United Kingdom | 260/169 |

OTHER PUBLICATIONS

Colour Index, 3rd Edition, vol. 4, p. 4278, Nos. 30015, 30020 and 30025; p. 4285, Nos. 30235 and 30245; p. 4286, No. 30270; p. 4313, Nos. 33540 and 33545; and p. 4329, No. 35255 (1971).

Primary Examiner—Floyd D. Higel
Attorney, Agent, or Firm—Gerald D. Sharkin; Richard E. Vila; Melvyn M. Kassenoff

[57] ABSTRACT

Dyes of the formula

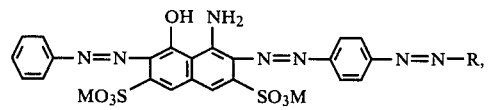

and mixtures thereof,
in which R signifies a radical of formula (a), (b), (c), (d), (e), (f), (g) or (h)

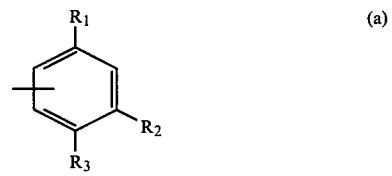

in which $R_1$ signifies an amino, anilino or toluidino radical,
$R_2$ signifies a hydroxy or amino radical, and
either $R_3$ signifies hydrogen,
or, where $R_1$ and $R_2$ signify amino, $R_3$ signifies hydrogen, nitro, —$SO_3M$ or $C_{1-6}$ alkyl;

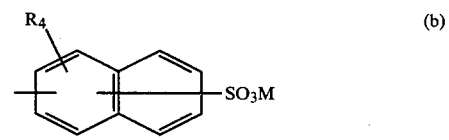

in which $R_4$ signifies a hydroxy, amino, anilino or toluidino radical, preferably a hydroxy or amino radical;

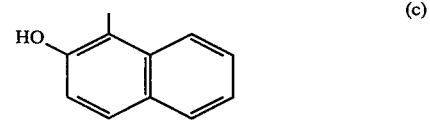

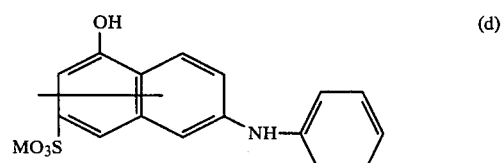

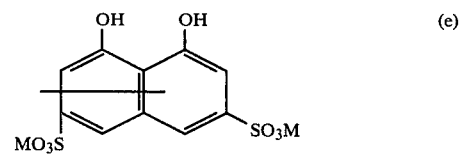

-continued

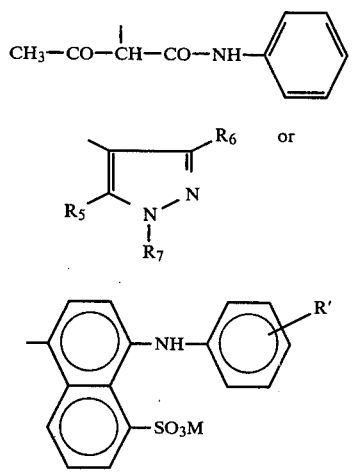

(f)

(g)

(h)

in which $R_5$ signifies a hydroxy radical, a $C_{1-6}$ alkylsulphonyloxy radical, a phenylsulphonyloxy radical, an amino radical, a $C_{1-6}$ alkylsulphonylamino radical or a phenysulphonylamino radical, preferably a hydroxy radical, $R_6$ signifies a $C_{1-6}$ alkyl, $C_{1-6}$ alkoxy, acetyl, carboxyl or carbamoyl radical, $R_7$ signifies hydrogen, an acyl radical or an unsubstituted or substituted $C_{1-6}$ alkyl, phenyl or naphthyl radical, $R'$ signifies hydrogen, methyl or methoxy, and M signifies hydrogen or an equivalent of a cation, useful for dyeing natural and regenerated cellulose, natural and synthetic polyamides, polyurethanes, basically modified polyolefins and anodized aluminum and particularly for dyeing paper and leather. The obtained dyeings have shades that range from blue and green to deep black and exhibit good fastness to light, wet treatments and sweat. The dyes build-up particularly well on nylon at neutral pH conditions and have good affinity for leather.

37 Claims, No Drawings

TRISAZO DYES HAVING A 4-(1-AMINO-3,6-DISULFO-8-HYDROXY-7-PHENYLAZONAPHTHYL-2-AZO)PHENYLAZO GROUP LINKED TO A COUPLING COMPONENT RADICAL

This application is a continuation of application Ser. No. 746,482, filed Dec. 1, 1976 and now abandoned, which in turn is a continuation-in-part of application Ser. No. 614,378, filed Sept. 18, 1975 and now abandoned, which in turn is a continuation-in-part of application Ser. No. 398,583, filed Sept. 19, 1973 and now abandoned.

The invention relates to azo compounds which contain sulphonic acid groups.

The invention provides compounds of formula I,

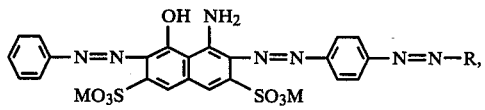
(I)

in which R signifies a radical of formula (a), (b), (c), (d), (e), (f) or (g),

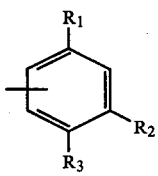
(a)

in which $R_1$ signifies an amino, anilino or toluidino radical, $R_2$ signifies a hydroxy or amino radical, and either $R_3$ signifies hydrogen, or, where $R_1$ and $R_2$ signify amino, $R_3$ signifies hydrogen, nitro, $-SO_3M$ or $C_{1-6}$ alkyl;

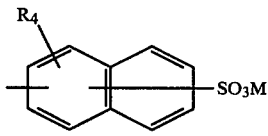
(b)

in which $R_4$ signifies a hydroxy, amino, anilino or toluidino radical, preferably a hydroxy or amino radical;

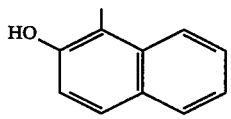
(c)

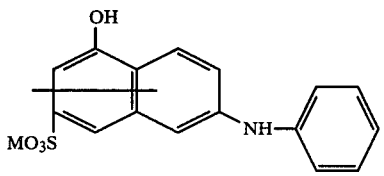
(d)

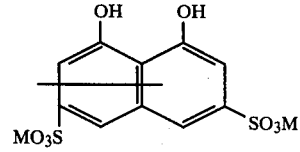
(e)

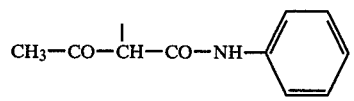
(f)

or

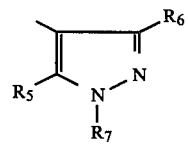
(g)

in which $R_5$ signifies a hydroxy radical, a $C_{1-6}$ alkylsulphonyloxy radical, a phenylsulphonyloxy radical, an amino radical, a $C_{1-6}$ alkylsulphonylamino radical or a phenylsulphonylamino radical, preferably a hydroxy radical, $R_6$ signifies a $C_{1-6}$ alkyl, $C_{1-6}$ alkoxy, acetyl, carboxyl or carbamoyl radical, $R_7$ signifies hydrogen, an acyl radical or an unsubstituted or substituted $C_{1-6}$ alkyl, phenyl or naphthyl radical, and M signifies hydrogen or an equivalent of a cation.

Where $R_7$ signifies a substituted alkyl radical, preferred substituents are alkoxy, chlorine, cyano and hydroxy, the alkyl radical, where substituted, preferably being monosubstituted.

Where $R_7$ signifies a substituted phenyl radical, preferred substituents are $-SO_3M$, nitro, cyano and amino, preferably only one such substituent, or up to 3 substituents selected from halogen atoms and $C_{1-6}$ alkyl and alkoxy radicals, the most preferred substituent being a $-SO_3H$ group.

Where $R_7$ signifies a substituted naphthyl radical, such preferably contains one or two $-SO_3M$ groups.

Where $R_7$ signifies an acyl radical, preferred such radicals are $C_{1-6}$, more preferably $C_{1-3}$, alkylcarbonyl, e.g. methylcarbonyl, ethylcarbonyl and propylcarbonyl, and phenylcarbonyl benzoyl radicals.

The preferred significance of $R_6$ is linear alkyl, especially methyl.

Any alkyl or alkoxy radicals or moieties in the compounds of formula I are preferably of 1, 2, 3 or 4 carbon atoms. Particularly preferred such radicals or moieties are of 1 to 3 carbon atoms, especially methyl, ethyl, methoxy and ethoxy, the most preferred being methyl and methoxy.

As used herein, halogen is intended to mean fluorine, chlorine or bromine, chlorine being the preferred halogen.

The invention also provides compounds of formula Ix,

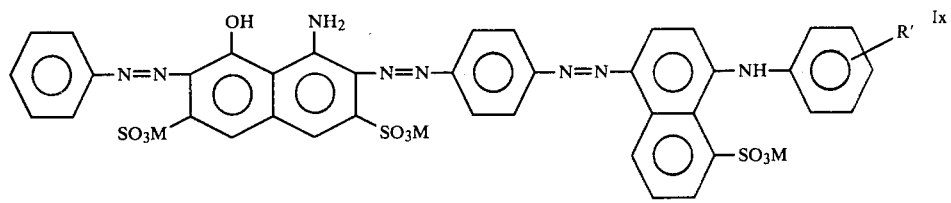

in which R' signifies hydrogen, methyl or methoxy, and M is a hydrogen ion or an equivalent of a cation.

Of the compounds of formula Ix, those where R' signifies hydrogen or methyl are preferred. Where R' signifies methyl, it is preferably para to the —NH-group.

Where M signifies an equivalent of a cation, suitable such cations are those generally used for salt formation in anionic dyestuffs. As examples of suitable cations may be mentioned the alkali metal cations, such as lithium, potassium and sodium, preferably sodium, cations, and ammonium cations, including the alkylammonium and mono-, di- and tri-alkanolammonium cations, in particular triethanolammonium and triisopropanolammonium cations. The ammonium cations can generally be represented by the formula $R_{10}R_{11}R_{12}N^{\oplus}$—H, in which $R_{10}$, $R_{11}$ and $R_{12}$, independently, signify hydrogen or $C_{1-4}$ alkyl which is unsubstituted or substituted by up to two, preferably one, hydroxy radicals, any hydroxyalkyl radical preferably having the hydroxy group at least two carbon atoms removed from the nitrogen. Preferably M is hydrogen or an alkali metal cation. The most preferred cation is sodium.

Preferred radicals of formula (a) are the radicals of formulae (aa) and (ab)

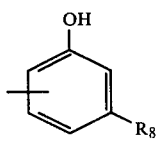
(aa)

where $R_8$ signifies amino, anilino or o-toluidino,

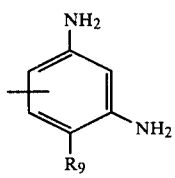
(ab)

where $R_9$ signifies hydrogen, methyl, nitro or —SO$_3$M, preferably hydrogen, methyl or —SO$_3$H.

Preferred radicals of formula (b) are the radicals of formulae (ba) and (bb)

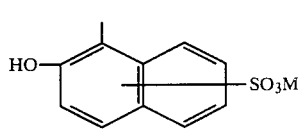
(ba)

where M is as defined above,

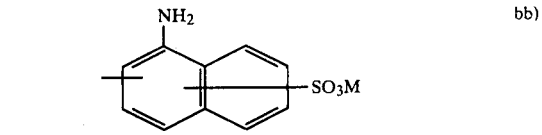
bb)

where M is as defined above.

As examples of radicals of formula (g) may be given
1-(p-chlorophenyl)-3-methylpyrazolone-5,
1-(o-, m-or p-alkylphenyl)-3-methylpyrazolone-5,
in which the alkyl radicals are of 1 to 6 carbon atoms and their preferred significances are as given above,
1-(di- or tri-alkylphenyl)-3-methylpyrazolone-5,
in which the alkyl radicals are of 1 to 6 carbon atoms and their preferred significances are as given above,
preferably
1-phenyl-3-methylpyrazolone-5 and
1-(o-, m- or p-sulphophenyl)-3-methylpyrazolone-5, and the corresponding derivatives of 5-aminopyrazole.

Preferred compounds of formula I are those wherein R signifies a radical of formula (a') or (b')

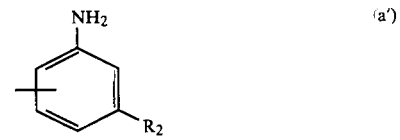
(a')

in which $R_2$ is as defined above,

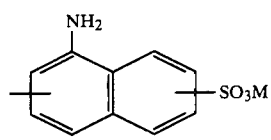
b')

in which M is as defined above.

The invention also provides a process for the production of compounds of formula I, stated above, characterised by coupling a diazo derivative of the compound of formula II

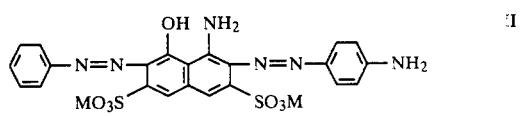
I with a coupling component of the formula R—H, in which R is as defined above.

Similarly, the compounds of formula Ix are formed by coupling the diazo derivative of the compound of formula II with a compound of formula III

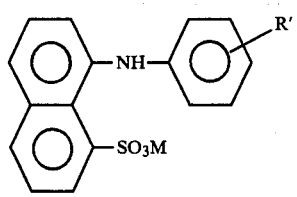

III in which R' and M are as defined above.

The diazotization of the compound of formula II and the reaction of the diazotized product with the compound R—H or of formula III are carried out in conventional manner, the coupling being effected in acid, neutral or basic medium.

The compounds of formulae I and Ix may be isolated in conventional manner.

The compounds of the formula R—H and of formula III are either known or may be produced in conventional manner from available starting materials.

The compound of formula II may be obtained, for example, by coupling, under acid conditions, the diazo derivative of p-nitroaniline or p-acetylaminoaniline with 1-amino-8-hydroxy-3,6-disulphonaphthalene, followed by coupling, under alkaline conditions, of aniline with the resulting product and, thereafter, where p-nitroaniline was employed, reducing the nitrogroup or, where p-acetylaminoaniline was employed, hydrolysing the reaction product. The reactions involved are all carried out in conventional manner as is the isolation of the compound of formula II from the reaction mixture.

As a particular aspect of the present invention there are provided mixtures of compounds of formula I, not only isomeric mixtures resulting from use of a single compound of the formula RH, as a result of the number of available coupling sites open and the competing directing influences of the substituents thereon, but, particularly, mixtures resulting from the use of a mixture of compounds of the formula RH in the coupling reaction or from admixing two or more compounds of formula I in which the R's differ.

Two component mixtures of compounds of formula I (i.e., where the R's are derived from different compounds of the formula RH) advantageously contain 10 to 50 mole % of one compound of formula I and 90 to 50 mole % of the other compound of formula I, preferably 20–35 mole % of one and 80 to 65 mole % of the other. A particularly preferred mixture is one wherein R of the first component is derived from 1,3-diaminobenzene and R of the second component is derived from 1-amino-3-hydroxybenzene; preferably, the mole % of the second component (R derived from 1-amino-3-hydroxybenzene) is greater than the mole % of the first component (R derived from 1,3-diaminobenzene). The most preferred mixture of this particular type is one containing 20–30 mole % of the first component (R derived from 1,3-diaminobenzene) and 80–70 mole % of the second component (R derived from 1-amino-3-hydroxybenzene).

As indicated above, and particularly where coupling is carried out with a compound of the formula RH, where R is a radical of formula (a), (b), (d) or (c), positional isomeric mixtures tend to be obtained. Such isomeric mixtures may be used as such or in admixture with another compound of formula I or may be separated in conventional manner. Generally, however, separation is not deemed worthwhile, the compounds being used as isomeric mixtures.

The compounds of formula I and mixtures thereof are useful as anionic dyes. They may be used alone or in mixture with other anionic dyes for the dyeing of textile and non-textile substrates capable of being dyed with anionic dyestuffs, e.g. anodized aluminum, natural or regenerated cellulose, natural or synthetic polyamides, polyurethanes or basically modified polyolefins, e.g. basically modified polypropylene. The substrates to be dyed may be in any desired form, e.g. as loose fibres, threads, filaments, non-woven fabrics, paper, felts, carpets, knitted fabrics, woven fabrics or semi-finished or finished goods. As natural fibre materials, cotton, wool and silk are particularly suitable. As synthetic fibre materials, nylon and basically modified polypropylene fibres are particularly suitable. A preferred application of the dyestuufs of the invention is in the dyeing of cellulosic non-woven fabrics and paper. The dyestuffs of the invention are, however, also most suitable for the dyeing of leather. The dyestuffs according to the invention may be used according to any desired processes suitable for the substrate being dyed, e.g. they may be applied by exhaust, padding or printing techniques. The compounds give dark-blue and dark green to deep-black dyeings which have good fastness properties on the above-mentioned substrates, for example light fastness, wet fastness such as wash fastness and sweat fastness. In addition, the dyes exhibit notable build-up properties on the above-mentioned substrates, especially build-up on nylon at neutral pH conditions. Furthermore, the dyes have notable affinity for leather, especially semi-chrome tanned leather.

On paper and leather the dyes of the present invention produce dyeings which have good stability to the action of pH, especially alkaline pH. Furthermore, the dyes of the present invention exhibit notable affinity for sized and unsized paper.

Similarly, the compounds of formula Ix are useful as anionic dyes and are suitable for dyeing the textile and non-textile substrates indicated above for the dyes of formula I. They are especially suitable for dyeing leather for which they have a particularly good affinity. The compounds of formula Ix give blue even dyeings and the dyeings, especially the leather dyeings, exhibit notable fastness properties, especially to light, buffing, solvents, formaldehyde and migration onto PVC, and the dyes exhibit resistance to hard water.

The invention is illustrated by the following Examples, in which the parts and percentages are by weight and the temperatures are in degrees Centigrade.

EXAMPLE 1

138 parts of para-nitroaniline are diazotised with hydrochloric acid and sodium nitrite in the customary manner and coupled at pH 1 to 2.5 with 319 parts of 1-amino-8-hydroxynaphthalene-3,6-disulphonic acid. Onto the thus obtained monoazo compound is coupled, at pH 9.5, the diazo compound from 93 parts of aniline. The resulting nitro-disazo compound is heated to 40° and the nitro group reduced to the amino group by addition of a solution of 117 parts of sodium sulphide in water. The amino-disazo dyestuff formed is separated out of the reaction solution by addition of 2000 parts of sodium chloride and adjustment of the pH to 4. The reaction product is stirred together with dilute hydrochloric acid and diazotised by dropwise addition of a sodium nitrite solution. To the diazotised dyestuff are added 109 parts of meta-aminophenol, dissolved in water, and this is coupled at pH 4 to 4.5. The dyestuff obtained is precipitated with sodium chloride. In dry form it is a black powder which dyes leather, paper, natural and synthetic polyamides and cotton in deep blue-black shades. If, instead of meta-aminophenol, a mixture consisting of 82 parts of meta-aminophenol and 27 parts of meta-phenylenediamine is used, a dyestuff is obtained which dyes leather a deep reddish-black.

In the following Table, the structural composition of further dyestuffs is stated; they can be prepared according to the procedure of Example 1 and correspond to formula I wherein R possesses the significances stated and M denotes sodium.

| Example No. | R | Shade of the dyeing on leather or paper |
|---|---|---|
| 2. | (3,4-diaminophenyl) | black |
| 3. | (methyl-diaminophenyl) | " |
| 4. | C₆H₅—NH—CO—CH—CO—CH₃ | dark-green |
| 5. | (OH-pyrazole with N=N—C₆H₅, CH₃) | " |
| 6. | (OH-pyrazole with N=N—C₆H₄—SO₃Na, CH₃) | " |
| 7. | (OH-phenyl-NH-phenyl) | blue-black |
| 8. | (OH-phenyl-NH-tolyl with CH₃) | " |
| 9. | (naphthyl-NH₂, SO₃Na) | navy blue |
| 10. | (naphthyl-NH₂, SO₃Na) | " |
| 11. | (OH-naphthyl) | " |
| 12. | (OH-naphthyl-SO₃Na) | navy blue |
| 13. | (NH₂, NH₂, SO₃Na benzene) | black |
| 14. | (OH-naphthyl-SO₃Na-NH-phenyl) | navy blue |
| 15. | (OH, OH naphthyl with two SO₃Na) | " |

EXAMPLE 16

138 parts of para-nitroaniline are diazotised in the normal manner with hydrochloric acid and sodium nitrite and are coupled at a pH of 1 to 2.5 with 319 parts of 1-amino-8-hydroxynaphthalene-3,6-disulphonic acid; the diazo derivative obtained from 93 parts of aniline is coupled with the thus obtained monoazo compound at a pH of 9.5 so as to form the disazo dyestuff. The nitro-disazo compound thus obtained is heated in the reaction medium to 40° and the nitro group is reduced to an amino group with the aid of a solution comprising 117 parts of sodium sulphide in water. The resultant amino-disazo dyestuff is separated from the reaction mixture by adding 2000 parts of sodium chloride and setting the pH at 4. The thus obtained dyestuff is stirred with dilute hydrochloric acid and is diazotised by the dropwise addition of sodium nitrite solution. 299 parts of 1-phenylamino-8-sulphonaphthalene, dissolved in 1000 parts of water, and 100 parts of caustic soda (30%) are added to the diazotised dyestuff and are coupled at a pH of 5–5.5. The thus obtained dyestuff is precipitated with sodium chloride. In dry form, it is a black powder which dyes leather, paper, natural or synthetic polyamides or cotton in blue shades.

EXAMPLE 17

If 1-p-toluidino-8-sulphonaphthalene (313 parts) is used instead of the 1-phenylamino-8-sulphonaphthalene employed in Example 16, a dyestuff is obtained which dyes leather in blue shades with similar properties.

EXAMPLE 18

If 1-o-toluidino- or 1-m-toluidino-8-sulphonaphthalene is used instead of 1-p-toluidino-8-sulphonaphthalene employed in Example 16, dyestuffs with properties similar to those of the dyes of Example 17 are obtained. Furthermore, by replacing the 299 parts of 1-phenylamino-8-sulphonaphthalene of Example 16 with 329 parts of 1-(p-methoxyphenylamino)-8-sulphonaphthalene, 1-(m-methoxyphenylamino)-8-sulphonaphthalene or 1-(o-methoxyphenylamino)-8-sulphonaphthalene, dyestuffs are obtained which have properties similar to those of the dyes of Examples 16 and 17.

APPLICATION EXAMPLE A 100 parts of freshly tanned and neutralised full grained chrome leather are drummed, in a liquor of 250 parts of water of 55° and 1 part of the dyestuff prepared according to Example 1, for 30 minutes in a dyeing drum treated for a further 30 minutes in the same bath with 2 parts of an anionic fat liquor based on sulphonated train oil, and the leathers are dried and finished in the usual manner. A very levely dyed leather in a blue-black shade is obtained.

In analogous manner, the dyestuffs of Examples 2–15 can be used, dyeings of the shade stated in the Table being obtained.

APPLICATION EXAMPLE B 100 parts of calf suéde leather are drummed for 4 hours with 1000 parts of water and 2 parts of ammonia in a dyeing drum and subsequently dyed in a fresh bath containing 500 parts of water at 55°, 2 parts of ammonia 10 parts of the dyestuff of Example 1 for 1 hour and 30 minutes in a dyeing drum. In order to exhaust the dye-bath, 4 parts of formic acid (85% strength) are added slowly and dyeing is continued until complete fixation of the dyestuff. The washed, dried and finished suéde leathers yield, after buffing of the suéde side, a deep blue-black dyed, very level suéde leather.

In analogous manner, the mixture of dyestuffs described in Example 1 and the dyestuffs of Examples 2–15 can be used.

APPLICATION EXAMPLE C 100 parts of lamb leather, chrome-vegetable tanned, and 10 parts of the dyestuff obtained in Example 1 are drummed in a liquor of 1000 parts of water at 55° containing 1.5 parts of an anionic sperm oil emulsion for 45 minutes in a dyeing drum. The dyestuff is fixed on the leather by slow addition of 5 parts of formic acid (85% strength) over 30 minutes. After the usual drying and finishing, a leather in deep blue-black shade of good levelness is obtained.

In analogous manner, the dyestuffs of Examples 2–15 can be used, dyeings of the shade stated in the Table being obtained.

APPLICATION EXAMPLE D

A solution of 200 parts of the dyestuff prepared according to Example 1 in 847 parts of water, 150 parts of ethyl glycol and 3 parts of formic acid (85% strength) is applied to the grain side of a buffed, combination-tanned box side leather by spraying on, plushing and pouring. The leather is dried and finished under mild conditions. A leather in deep blue-black shade and of good fastnesses is obtained.

In analogous manner, the dyestuffs of Examples 2–15 can be used, dyeings of the shade stated in the Table being obtained.

APPLICATION EXAMPLE E (a) In a hollander, 100 parts of chemically bleached sulphite cellulose are beaten in 2000 parts of water. To this mass are added 4 parts of the powdered dyestuff of Example 1. After 15 minutes the sizing is carried out, followed by fixation. Paper produced from this mass possesses a deep blue-black coloration with good wet- and light-fastness.

In analogous manner, the dyestuffs of Examples 2–15 can be used, dyeings of the shade stated in the Table being obtained.

(b) In a pulper, 70 parts of chemically bleached sulphite cellulose (from softwood) and 30 parts of chemically bleached sulphate cellulose (from birchwood) are beaten in 2000 parts of water. Into this mass is strewn 0.4 parts of the dyestuff of Example 1. After 20 minutes, paper is made from this mass. The paper produced from this mass is dyed grey.

In analogous manner, the dyestuffs of Examples 2–15 can be used, dyeings of the correspondingly lighter shade stated in the Table being obtained.

APPLICATION EXAMPLE F 100 parts of afterchromed East Indian goatskin suede (clothing grade) and 10 parts of the dyestuff obtained in Example 16 are milled for 1½ hours in a bath containing 1000 parts of water at 55°. The dyestuff is fixed over the course of 60 minutes by adding 7.5 parts of 85% formic acid. After the usual drying and finishing processes, a leather which is evenly dyed in a navy-blue shade is obtained.

APPLICATION EXAMPLE G 100 parts of chemically bleached sulphite cellulose (of soft wood or hard wood) are ground in a hollander in 2000 parts of water. 4 parts of the dyestuff obtained in Example 16 are added to this mass as a powder or in solution. After 15 minutes, sizing is effected followed by fixing. Paper produced from this stock has a navy-blue shade with good wet and light fastness.

What is claimed is:

1. A compound of the formula

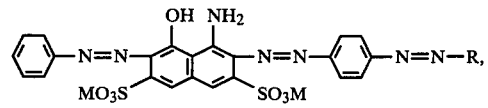

or a mixture of such compounds,
wherein R is

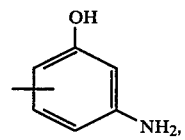

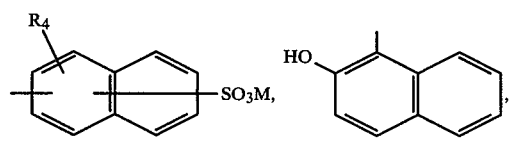

11

-continued

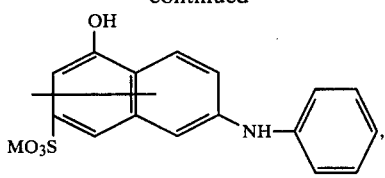

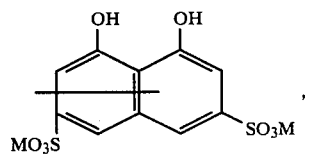

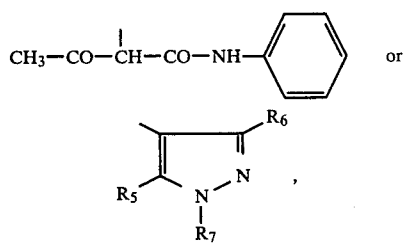 or wherein R₄ is hydroxy, —NH₂, anilino or toluidino,
R₅ is hydroxy, $C_{1-6}$alkylsulfonyloxy, phenylsulfonyloxy, —NH₂, $C_{1-6}$alkylsulfonylamino or phenylsulfonylamino,
R₆ is $C_{1-6}$alkyl, $C_{1-6}$alkoxy, acetyl, carboxy or carbamoyl, and
R₇ is hydrogen; ($C_{1-6}$alkyl)carbonyl; benzoyl; $C_{1-6}$alkyl; $C_{1-6}$alkyl substituted by $C_{1-6}$alkoxy, chloro, cyano or hydroxy; phenyl; phenyl substituted by —SO₃M, nitro, cyano or —NH₂ or by 1 to 3 substituents independently selected from the group consisting of halo, $C_{1-6}$alkyl and $C_{1-6}$alkoxy; naphthyl or naphthyl monosubstituted or disubstituted by —SO₃M, wherein each halo is independently fluoro, chloro or bromo, and
each M is hydrogen or a cation.

2. A compound according to claim 1 having the formula

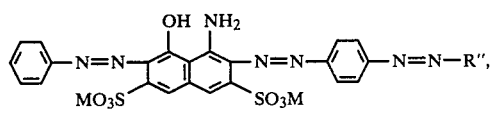

or a mixture of such compounds,
wherein R″ is

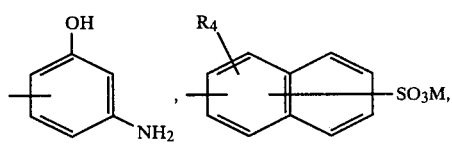

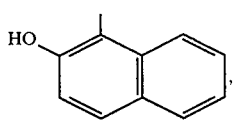

12

-continued

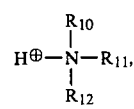

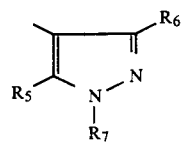

wherein R₄ is hydroxy, —NH₂, anilino or toluidino, and
each M is hydrogen or a cation.

3. A compound according to claim 1, or a mixture of such compounds,
wherein each M is hydrogen, an alkali metal cation or $$H^{\oplus}-\underset{\underset{R_{12}}{|}}{\overset{\overset{R_{10}}{|}}{N}}-R_{11},$$

wherein each of $R_{10}$, $R_{11}$ and $R_{12}$ is independently hydrogen, $C_{1-4}$alkyl or $C_{1-4}$alkyl monosubstituted or disubstituted by hydroxy.

4. A compound according to claim 1,
wherein R is

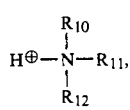

5. A compound according to claim 2.
6. A compound according to claim 2, or a mixture of such compounds,
wherein each M is hydrogen, an alkali metal cation or $$H^{\oplus}-\underset{\underset{R_{12}}{|}}{\overset{\overset{R_{10}}{|}}{N}}-R_{11},$$

wherein each of $R_{10}$, $R_{11}$ and $R_{12}$ is independently hydrogen, $C_{1-4}$alkyl or $C_{1-4}$alkyl monosubstituted or disubstituted by hydroxy.

7. A compound according to claim 6, or a mixture of such compounds,
wherein each M is hydrogen, lithium, sodium or potassium.

8. A compound according to claim 7.
9. A compound according to claim 2, or a mixture of such compounds, wherein R″ is

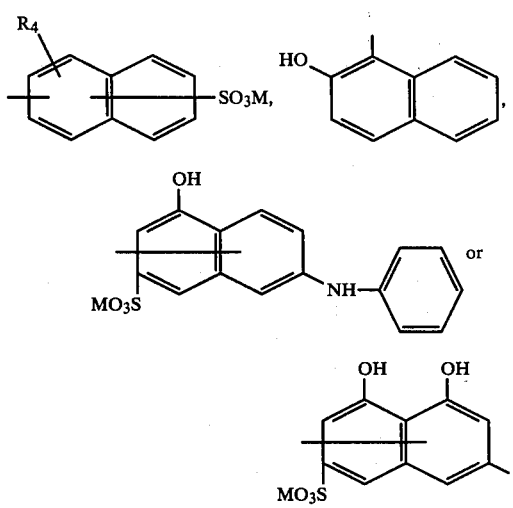

wherein R$_4$ is hydroxy, —NH$_2$, anilino or toluidino.

10. A compound according to claim 9.

11. A compound according to claim 10 wherein R″ is

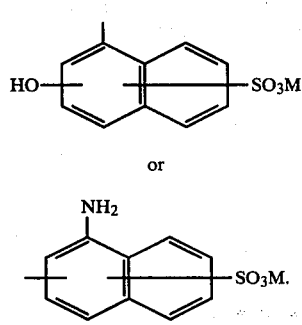

or

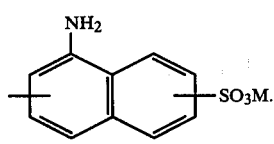

12. A compound according to claim 11 wherein R″ is

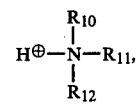

13. A compound according to claim 12 having the formula

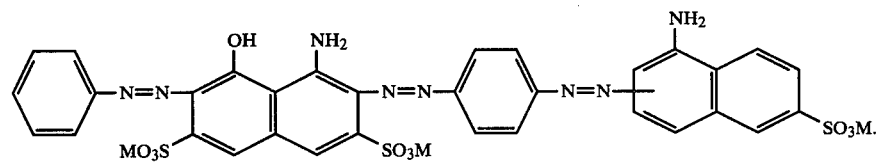

14. A compound according to claim 2 wherein R″ is

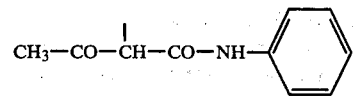

15. A mixture comprising
(a) a compound of the formula

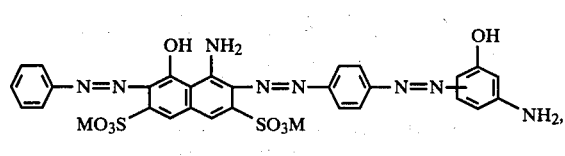

or a mixture of such compounds,
and (b) a compound of the formula

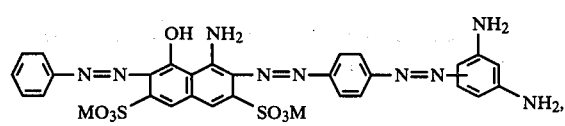

or a mixture of such compounds,
wherein each M is hydrogen or a cation, and
the mole ratio of (a) to (b) is 1:9–9:1.

16. A mixture according to claim 15 wherein the mole ratio of (a) to (b) is greater than 1:1.

17. A mixture according to claim 16 wherein the mole ratio of (a) to (b) is 2 1/3:1–4:1.

18. A compound according to claim 2 having the formula

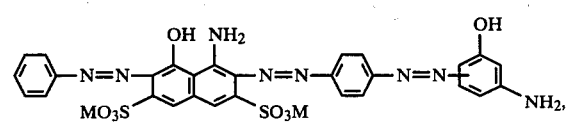

or a mixture of such compounds.

19. A compound according to claim 18, or a mixture of such compounds,
wherein each M is hydrogen, an alkali metal cation or

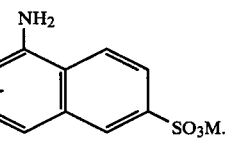

wherein each of R$_{10}$, R$_{11}$ and R$_{12}$ is independently hydrogen, C$_{1-4}$alkyl monosubstituted or disubstituted by hydroxy.

20. A compound according to claim 19, or a mixture of such compounds,
wherein each M is hydrogen, lithium, sodium or potassium.

21. A compound according to claim 20, or a mixture of such compounds,
   wherein each M is sodium.
22. A compound according to claim 18.
23. A mixture of compounds according to claim 2 comprising, aside from isomeric forms, at least two compounds of the formula

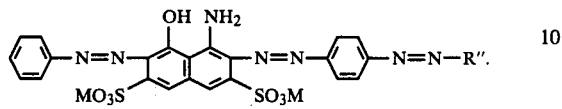

24. A mixture of compounds according to claim 23 comprising, aside from isomeric forms, two compounds of the formula

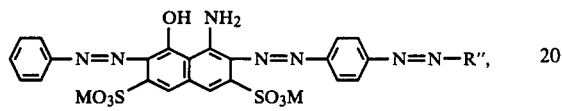

wherein the mole ratio of one compound to the other is 1:1 to 9:1.

25. A mixture of compounds according to claim 24 wherein the mole ratio of one compound to the other is 1 6/7:1 to 4:1.

26. A compound of the formula

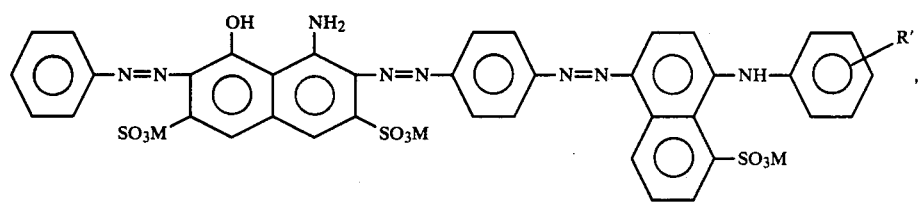

wherein $R'$ is hydrogen, methyl or methoxy, and each M is hydrogen or a cation.

27. A compound according to claim 26 wherein each M is hydrogen, an alkali metal cation or

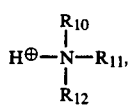

wherein each of $R_{10}$, $R_{11}$ and $R_{12}$ is independently hydrogen, $C_{1-4}$alkyl or $C_{1-4}$alkyl monosubstituted or disubstituted by hydroxy.

28. A compound according to claim 27 wherein each M is hydrogen, lithium, sodium, potassium or

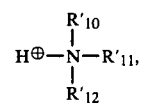

wherein each of $R'_{10}$, $R'_{11}$ and $R'_{12}$ is independently hydrogen, $C_{1-4}$alkyl or $C_{2-4}$-hydroxyalkyl wherein at least two carbon atoms separate the hydroxy group from the nitrogen atom.

29. A compound according to claim 28 wherein each M is hydrogen, lithium, sodium or potassium.

30. A compound according to claim 26 wherein $R'$ is methoxy.

31. A compound according to claim 26 wherein $R'$ is hydrogen or methyl.

32. A compound according to claim 31 wherein each M is hydrogen, lithium, sodium or potassium.

33. A compound according to claim 31 wherein $R'$ is hydrogen or 4-methyl.

34. A compound according to claim 33 wherein $R'$ is hydrogen.

35. A compound according to claim 34 wherein each M is hydrogen, lithium, sodium or potassium.

36. A compound according to claim 33 wherein $R'$ is 4-methyl.

37. A compound according to claim 36 wherein each M is hydrogen, lithium, sodium or potassium.

* * * * *